United States Patent
Sullivan

[11] Patent Number: 6,145,290
[45] Date of Patent: Nov. 14, 2000

[54] COMBINATION MULCHING AND DISCHARGING LAWN MOWER BLADE

[76] Inventor: Patrick D. Sullivan, 1603 Woodridge Dr., Chippewa Falls, Wis. 54729

[21] Appl. No.: 09/006,148

[22] Filed: Jan. 13, 1998

[51] Int. Cl.[7] .................................................. A01D 34/68
[52] U.S. Cl. ............................................. 56/255; 56/17.5
[58] Field of Search ..................................... 56/16.9, 17.5, 56/255, 295, 320.2, 320.1, DIG. 17, DIG. 20

[56] References Cited

U.S. PATENT DOCUMENTS

| | | | |
|---|---|---|---|
| 3,162,990 | 12/1964 | Cook | 56/295 |
| 4,292,791 | 10/1981 | Lalonde | 56/255 |
| 5,109,656 | 5/1992 | Zimmer | 56/17.5 |
| 5,179,823 | 1/1993 | Pace | 56/16.9 |
| 5,209,052 | 5/1993 | Carroll | 56/255 |
| 5,363,635 | 11/1994 | White, III et al. | 56/255 |
| 5,398,490 | 3/1995 | Allen | 56/244 |
| 5,501,068 | 3/1996 | Martz | 56/255 |
| 5,537,807 | 7/1996 | Gearing et al. | 56/11.3 |
| 5,561,972 | 10/1996 | Rolfe | 56/295 |
| 5,642,609 | 7/1997 | Morrison | 56/295 |
| 5,832,704 | 11/1998 | Routh | 56/17.5 X |

*Primary Examiner*—Robert E. Pezzuto
*Attorney, Agent, or Firm*—Fogg, Slifer & Polglaze P.A.; Russell D. Slifer

[57] ABSTRACT

A lawn mower blade includes a mulching blade and a discharge blade which operate in combination. Both the mulching blade and the discharge blade have primary and secondary cutting surfaces. Optional cut-out regions provided in both blades reduce the total weight of the lawn more blade. A third cutting surface can be provided in both blades by sharpening the trailing edge of the cut-out region. The primary cutting surface of the mulching blade resides on a first horizontal cutting plane, while the primary cutting surface of the discharge blade resides on a second horizontal cutting plane which is elevated above the first horizontal cutting plane of the mulching blade.

14 Claims, 5 Drawing Sheets

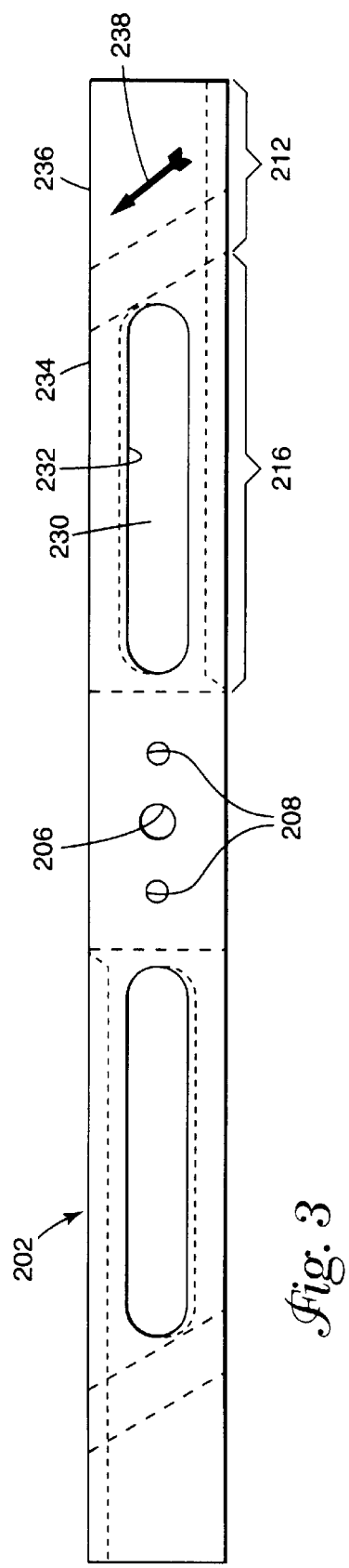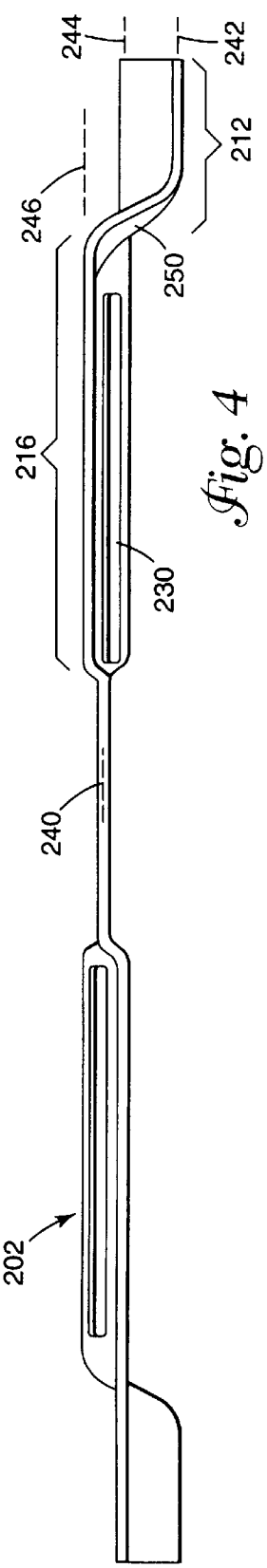

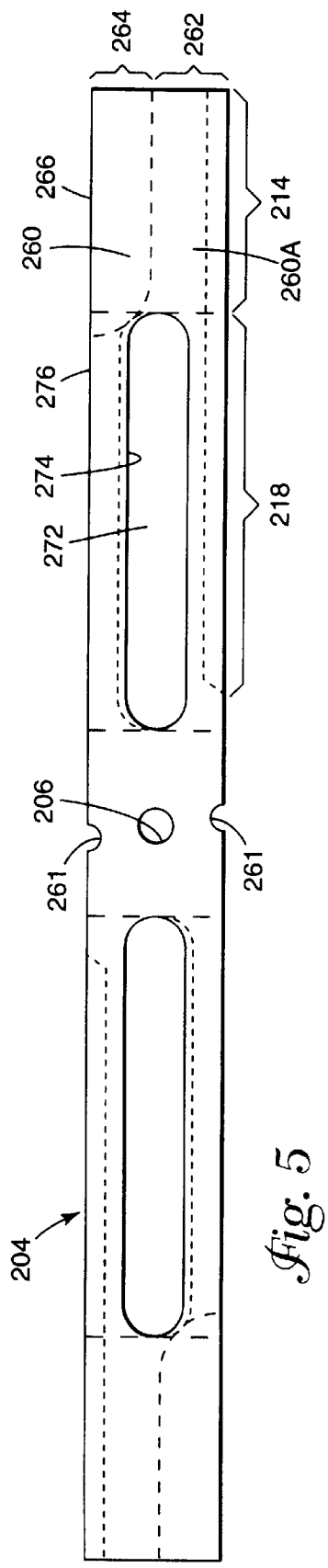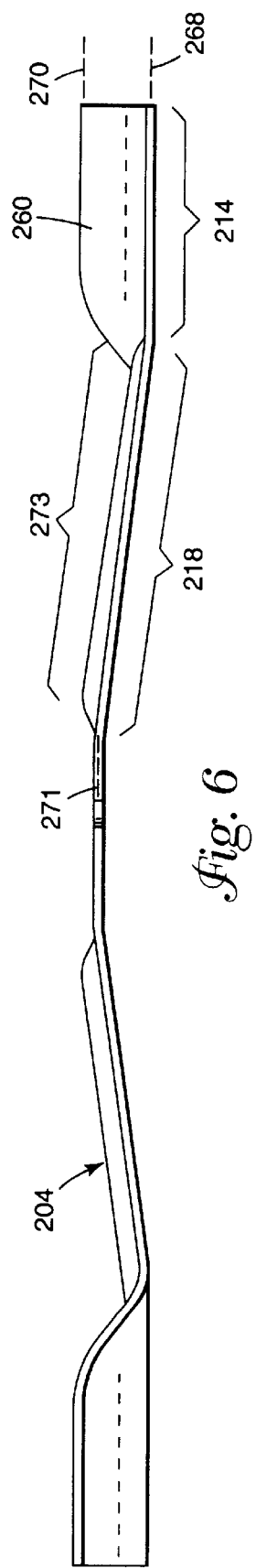

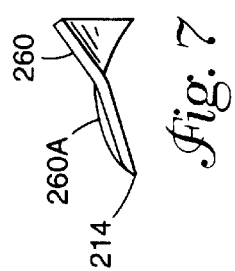
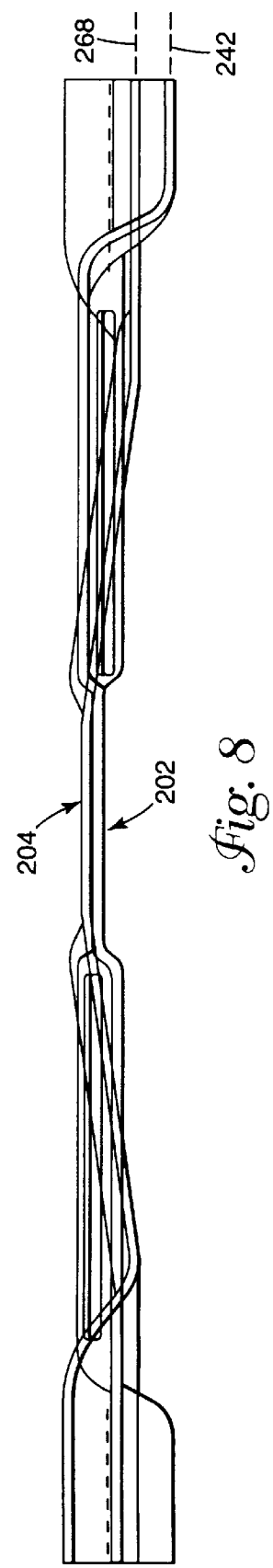

COMBINATION MULCHING AND DISCHARGING LAWN MOWER BLADE

TECHNICAL FIELD OF THE INVENTION

The present invention relates generally to lawn mower blades and in particular the present invention relates to a combination mulching and discharging lawn mower blade system.

BACKGROUND OF THE INVENTION

Lawns of American homes are maintained by cutting grass with a lawn mower. These lawn mowers are either manually powered or powered by an engine to rotate a cutting blade. Powered lawn mower engines can be operated using gas or electric energy, and reduce the effort required by a manual lawn mower. As a result of environmental concerns, the design and use of power lawn mowers with mulching operation are now widespread. The mulching lawn mower is specifically designed to circulate cut grass under the lawn mower such that it is re-cut to a fine mulch. To accomplish this, the bottom surface of the lawn mower is generally shaped like a doughnut and a special mulching blade is used. The combination of these features creates a swirling action to direct cut grass toward the center of the mower where it is re-cut and then deposited on the lawn without being discharged from the mower through a shoot.

It is desired, however, to still collect cut grass from a lawn mower using an attached bag. That is, at times a lawn may be too long for efficient mulching, or the lawn may be covered with leaves. Under such circumstances, collecting the cut material may be desired. Most lawn mower manufacturers offer bag attachments for mulching lawn mowers. The intended functions of the mulching lawn mower, re-cutting circulated grass and depositing on a lawn, is an inherent conflict with the bagging operation. That is, because the cut grass is directed toward the center of the lawn mower, minimal cut grass can be discharged into an attached bag.

For the reasons stated above, and for other reasons stated below which will become apparent to those skilled in the art upon reading and understanding the present specification, there is a need in the art for a mulching lawn mower and blade which can efficiently mulch cut grass while allowing for substantial discharge of cut grass to a bag when desired.

SUMMARY OF THE INVENTION

The above-mentioned problems with lawn mowers and other problems are addressed by the present invention and which will be understood by reading and studying the following specification. A lawn mower blade assembly is described which includes a mulching blade and a discharge blade.

In particular, the present invention describes a lawn mower blade assembly comprising a mulching blade having first primary cutting surfaces and a discharge blade having first primary cutting surfaces. The mulching blade is adapted to attach to a lawn mower such that when rotated about its vertical axis the primary cutting surfaces of the mulching blade rotate through a first horizontal plane. The discharge blade is adapted to attach to the lawn mower in combination with the mulching blade such that when rotated about its vertical axis the primary cutting surfaces of the discharge blade rotate through a second horizontal plane. The second horizontal plane is vertically displaced above the first horizontal plane.

In a second embodiment, a lawn mower comprises a carriage assembly, a motor mounted to the carriage assembly and having a vertical shaft extending downwardly from the carriage assembly, a mulching blade having first primary cutting surfaces, and a discharge blade having first primary cutting surfaces. The mulching blade is adapted to attach to the vertical shaft of the lawn mower at its vertical axis, such that when rotated about its vertical axis the primary cutting surfaces of the mulching blade rotate through a first horizontal plane. The discharge blade is adapted to attach to the vertical shaft of the lawn mower at its vertical axis, such that when rotated about its vertical axis the primary cutting surfaces of the discharge blade rotate through a second horizontal plane which is vertically displaced above the first horizontal plane. Further, the discharge blade is adapted to attach to the vertical shaft such that when the mulching blade and the discharge blade are rotated about their vertical axis, the first primary cutting surfaces of the discharge blade are angularly located less than 90 degrees behind the primary cutting surfaces of the mulching blade.

In yet another embodiment, a lawn mower discharge blade comprises an elongated mental blade having first primary cutting surfaces. The discharge blade is adapted to attach to a lawn mower in combination with a mulching blade such that when rotated about its vertical axis the primary cutting surfaces of the discharge blade rotate through a horizontal plane. The horizontal plane is vertically displaced above a horizontal cutting plane from the mulching blade. The discharge blade is further adapted to attach to the lawn mower such that when the mulching blade and the discharge blade are rotated about their vertical axis, the first primary cutting surfaces of the discharge blade are angularly located less than 90 degrees behind primary cutting surfaces of the mulching blade.

BRIEF DESCRIPTION OF THE DRAWINGS

FIG. 3 is a top view of a mulching blade of FIG. 2;

FIG. 4 is a side view of the mulching blade of FIG. 3;

FIG. 5 is a top view of a discharge blade of FIG. 2;

FIG. 6 is a side view of the discharge blade of FIG. 5;

FIG. 7 is an end view of the discharge blade of FIG. 6; and

FIG. 8 illustrates a superimposed side view of the mulching and discharge blades of FIG. 2.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
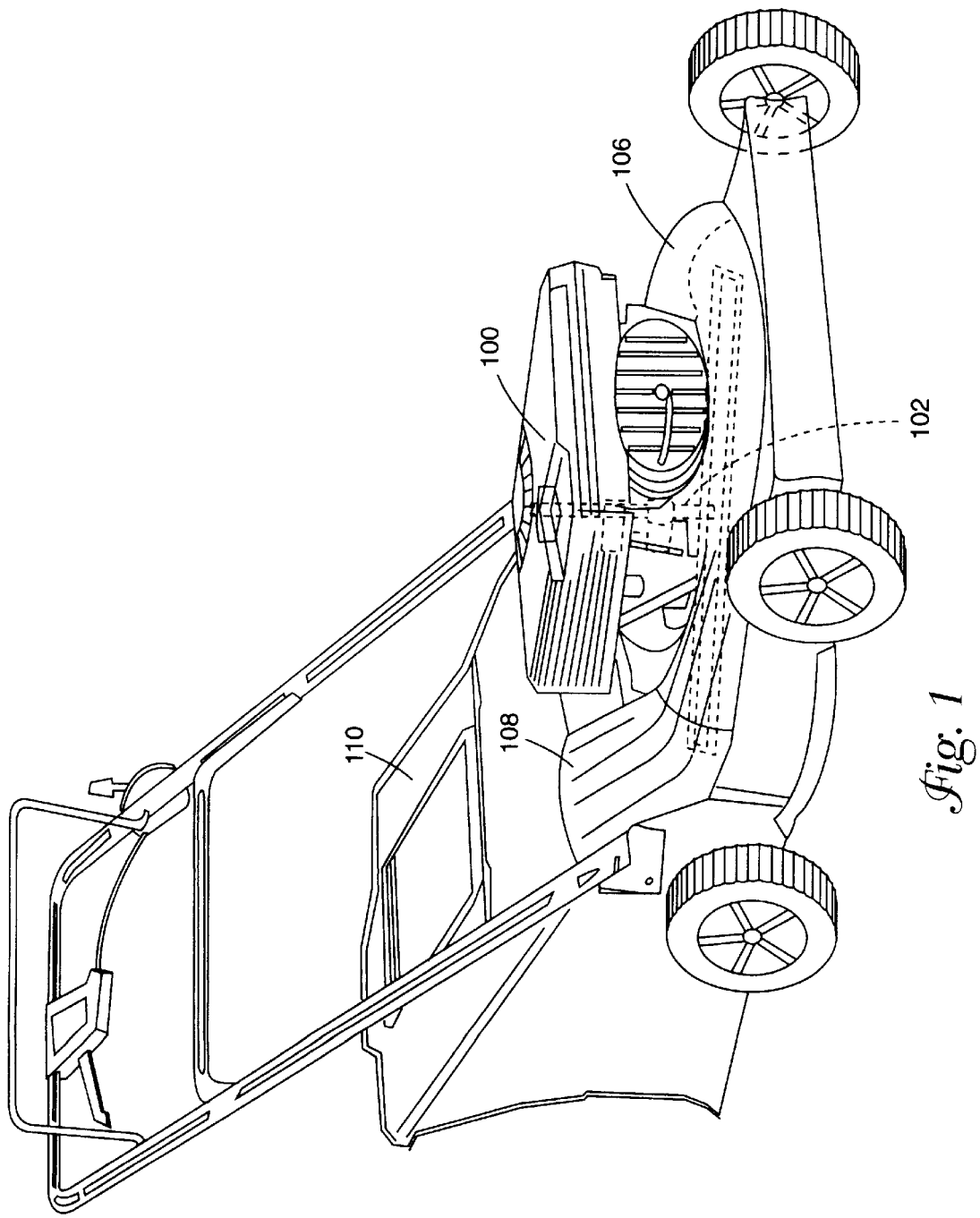
FIG. 1 is a general illustration of a lawn mower.

FIG. 1 illustrates a power lawn mower incorporating the present invention. The lawn mower includes a motor 100 mounted on carriage assembly 106 for rotating a vertically extending shaft 102 which is attached to a blade located on a bottom of the mower. Traditionally, lawn mowers include a blade which cuts grass and then discharge the grass from under the mower through a shoot 108 to be spread on the lawn, or collected in a bag 110 attached to the shoot. Mulching lawn mowers, however, cannot effectively mulch and discharge. This problem is addressed herein.

Figure 2:
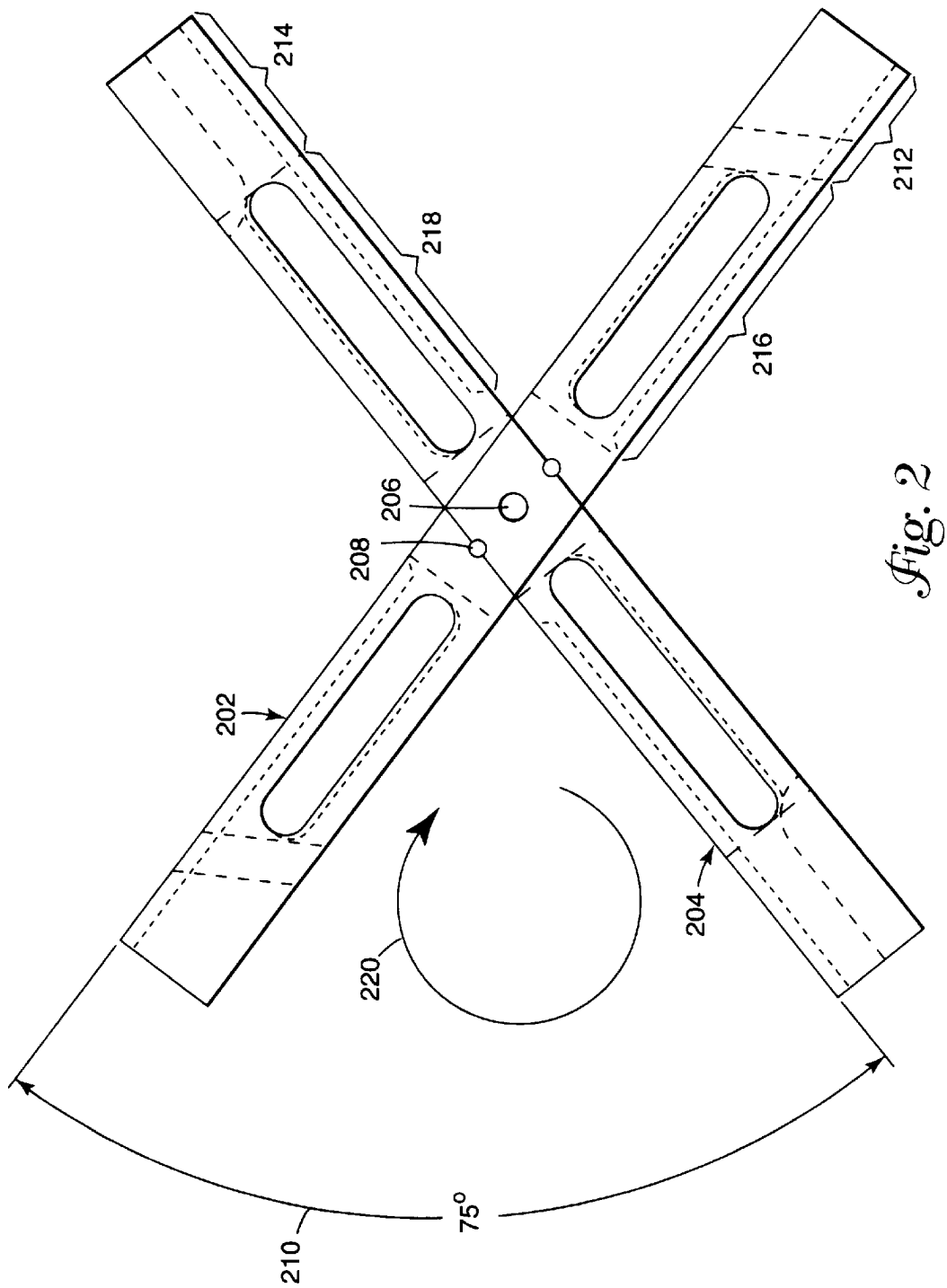
FIG. 2 is a top view of an embodiment of the lawn mower blade of the present invention.

Referring to FIG. 2, a lawn mower blade assembly of the present invention is described. The assembly includes a mulching blade 202 and a discharge blade 204. The individual features and operation of these blades are described in the following paragraphs. The two blades are adapted to be attached to a lawn mower via mounting holes 206 and 208, as known to those skilled in the art. The blade combination is rotated about its center axis in the direction indicated by arrow 220. A leading edge of the mulching blade 202 includes a primary cutting surface 212 and a secondary cutting surface 216. Likewise, discharge blade 204 has a leading edge which includes a primary cutting surface 214 and a secondary cutting surface 218. A rotational angle between the leading edge of the mulching blade and the discharge blade is less than 90 degrees. In a preferred embodiment, the leading edges are less than 75 degrees apart, reference 210.

FIGS. 3 and 4 illustrate top and front views, respectively, of mulching blade 202. Referring to FIG. 3, the mulching blade includes hole 206 centered about a vertical axis of the blade for mounting to a motor driven shaft of the lawn mower. Standard mounting holes 208 are also provided. The mulching blade is designed to cut a lawn using primary cutting surface 212. To understand the operation of a mulching blade, an explanation of its features and function as used in a stand alone mulching system is provided. It will be understood, that the operation of the combined mulching and discharge blades of the present invention differs from the stand alone blade operation. Once grass is cut by edge 212, it is directed inwardly along the direction of arrow 238 and lifted into the air. As the blade rotates, this cut grass is re-cut by secondary cutting surface 216 of the opposite end of the blade which has rotated 180 degrees. The re-cut grass is then directed down toward the lawn. The movement of cut grass is further understood by reference to FIG. 4. It can be seen that cutting-edge 212 is formed along plane 242. The trailing edge of the blade 236 is formed along plane 244, which is elevated above plane 242. Thus, cut grass is lifted toward the bottom of a lawn mower. Because the blade has an angled step feature 250, the grass is also directed inwardly toward the blade axis. Secondary cutting edge 216, formed along elevated plane 246, re-cuts the grass. The trailing edge 234 of this portion of the blade is also formed on plane 244, which is below plane 246. Thus, the re-cut grass is directed in a downward direction toward the ground. The center region of the blade is formed on plane 240.

A solo mulching blade, therefore, is not ideally suited for discharging grass into a bag collection system. The mulching blade 202 when combined with discharge blade 204 operates in a different manner which facilitates efficient grass collection, as explained below. But first, a few additional features of the mulching blade of the present invention are described.

When the mulching blade is combined with the discharge blade, the combined weight can create difficulty in starting a lawn mower engine. That is, the combined weight resists rotation by a user who is pulling on a starter cord of the motor. To alleviate this problem, cut-out regions 230 are provided in the mulching blade. These regions are designed to reduce the blade weight while not adversely affecting the rigidness of the blade. Further, the trailing edge 232 of the cut-out regions 230 can be sharpened to create a third cutting surface. In a prototype system, plane 244 was ⅞ of an inch higher than plane 242, and ⅜ of an inch lower than plane 240. Further, plane 246 was ½ of an inch higher than plane 244.

Referring to FIGS. 5 through 7, the discharge blade 204 of the present invention is described. The blade includes a hole 206 for receiving the lawn mower shaft as described above for the mulching blade. Cut-out sections 261 are provided and correspond with holes 208 of the mulching blade to align the discharge blade in a fixed position with respect to the mulching blade. It will be appreciated that other features known to those skilled in the art can be used to fix the relative position of the blades. That is, different features can be added to the blades, or the blades can be welded together to form one unit.

FIG. 5 illustrates the discharge blade of the present invention which includes features not included in a standard discharge blade. Prior to describing these features, an explanation of a standard discharge blade is provided. In a standard discharge blade operation, cutting edge 214 cuts grass from a lawn and directs the cut grass along lifting ridge 260. Unlike the mulching blade, the cut grass is not directed toward the center of the blade, but is allowed to either exit the lawn mower through a discharge shoot or fall to the ground. Additional cutting surfaces are typically not provided on a standard discharge blade.

The present invention provides a modified discharge blade 204 which includes secondary cutting surfaces 218. As described below, these secondary cutting surfaces operate to mulch grass in the same manner as secondary cutting surfaces 216 of the mulching blade. The discharge blade includes a lifting ridge 260 formed at the ends of the blade on the trailing edge behind primary cutting surface 214. As seen in FIG. 7, the leading-edge of the blade 260A is slightly crowned and slopes up by approximately 15 degrees to meet lifting ridge 260. The lifting ridge is sloped upward by approximately 45 degrees.

Cut-out regions 272 are optionally provided to reduce the weight of the discharge blade, in the same manner as the cut-out regions of the mulching blade. A trailing edge 274 of the cut-out regions can also be sharpened to create a third cutting surface. A cross section of the discharge blade from secondary cutting surface 218 to trailing edge 276 is slightly crowned in the middle (273 on FIG. 6). This feature provides additional rigidness to the discharge blade when the cut-out regions are included. Referring to FIG. 6, it can be seen that a center region of the blade is formed on plane 271 while primary cutting surfaces 214 are formed along a lower plane 268. Further, a trailing edge 266 of the lifting ridge is formed along plane 270.

Referring to FIG. 8, a superimposed illustration of the mulching blade and the discharge blade is provided. When the blades are combined and attached to a lawn mower the discharge blade can be mounted above the mulching blade. Primary cutting surfaces 214 of the discharge blade, which are formed along plane 268, are vertically above the primary cutting surfaces 212 of the mulching blade which are formed along plane 242. The vertical distance between these primary cutting surfaces is provided such that the mulching blade defines a cut height during a mowing operation. The vertical distance between the blades is approximately ¼ inch. It will be appreciated, however, that this value can be changed to maximize performance for different blade configurations. Because the discharge blade is above the mulching blade, the discharge blade does not function to cut grass from the lawn.

Referring again to FIG. 2, the operation of the combined mulching blade and discharge blade is described in the best manner possible. When the combined lawn mower blade of the present invention is attached to a lawn mower engine, the mulching blade and the discharge blade operate differently than when they are used in a solo operation. Because the primary cutting surface 212 of mulching blade 202 is on a lower horizontal cutting plane than the primary cutting surface 214 of discharge blade 204, the mulching blade cuts grass from the lawn. This cut grass is then raised by the trailing edge 236 of the mulching blade, and some of the cut grass is directed inwardly along ridge 250. Because discharge blade 204 is rotating behind the mulching blade and has an elevated primary cutting surface, primary cutting surface 214 re-cuts the grass which was cut by the mulching blade but not fully directed inward. Adjusting the angular distance between the leading-edges of the two blades can be performed to optimize the amount of grass cut by this surface. Secondary cutting surface 218 of the discharge blade re-cuts grass which was directed inwardly by the mulching blade. Thus, the cut grass is effectively mulched by the different cutting surfaces of the discharge blade. Grass which is cut by the discharge blade's primary cutting surface 214, is elevated by the trailing edge 266 of the discharge blade, and lifting ridge 260. This grass is available for discharge from under the lawn mower and into a collecting bag attached to a discharge shoot of the lawn mower. Further, grass which is re-cut by the secondary cutting surface 218 of the discharge blade is directed downward toward the ground. However, secondary cutting surface 216 of the following mulching blade re-cuts some of this grass before it reaches the ground. In addition, optional cutting surfaces 232 and 274 which can be provided in the mulching blade and discharge blade, respectively, also operate to re-cut grass. The combined mulching and discharge blade, therefore, provide an extremely fine mulch which can be efficiently discharged and collected.

The present invention operates in an unexpected manner. A prototype was constructed and tested. The prototype lawn mower provided an extremely fine mulch which could be easily collected in a bag attached to the lawn mower. Debris lying on the lawn, such as leaves or dead grass left from a previous mowing, was mulched and discharged into the bag along with the fresh cut grass. As such, the combined lawn mower blade creates a strong vacuum under the lawn mower which circulates grass and other debris for multiple cutting operations which are not easily described herein. The lift provided by the discharge blade straightens up grass previously cut by the primary cutting surface 212 of the mulching blade. Subsequent passes of the primary cutting surfaces 212 further trims the length of the grass. This yields a plush cut without the wheel tracks which are left by typical single mulching blades. This action is present with or without the discharge collection bag attachment.

As stated above, an often encountered negative side affect, inherent in the blade design used to produce a swirling action in a mulching lawn mower, is the lack of an uplifting air stream. This is produced by blades designed for bagging clippings, and straightens grass that is bent over by the passage of the front tires of a lawn mower. The wheel tracks, therefore, are mostly eliminated when an uplifting air stream is provided, resulting in a smooth cut over the entire cutting swathe. Likewise, longer grass that is laid over due to moisture or mated-over grass in high traffic areas present the same problems to mulching blades.

The vacuuming, uplift action of a bagging blade is enhanced in the present invention by the vertical offset between the primary cutting surface 212 of the mulching blade and the primary cutting surface 214 of the discharge blade. This vertical offset allows air to flow into the carriage assembly and out the discharge shoot un-impeded by the underlying turf.

To emphasize the unexpected operation of the present invention, the prototype was assembled on a commercially available mulching lawn mower which had an optional collection bag. Using the mulching lawn mower blade provided by the manufacturer, a plot of lawn 50 by 50 feet yielded about 5 pounds of mulch while filling a bag about half full. When the grass was damp, the discharge shoot clogged and the bag remained essentially empty. The manufacturer indicated that it did not offer a mulching blade that could truly collect the grass in a bag, but that the bag attachment could be used to collect some of the cut grass in dry conditions. Using the blade of the present invention, this same commercially available premium lawn mower discharged enough grass to fill the bag to bulging with about 25 pounds of fine mulch, while cutting 50 by 50 plots of the same lawn.

CONCLUSION

A lawn mower blade has been described which includes a mulching blade and a discharge blade which operate in combination. Both the mulching blade and the discharge blade have primary and secondary cutting surfaces. Cut-out regions are provided in both blades to reduce the total weight of the lawn mower blade. A third cutting surface can be provided in both blades by sharpening the trailing edge of the cut-out region. The primary cutting surface of the mulching blade has been described as residing on a first horizontal cutting plane, while the primary cutting surface of the discharge blade resides on a second horizontal cutting plane which is elevated above the first horizontal cutting plane of the mulching blade. Detailed descriptions of the features of one embodiment of the mulching blade and the discharge blade are provided.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the height difference between the primary cutting surfaces of the mulching blade and the discharge blade can be changed. Further, the angular distance between the leading-edge of the blades can be adjusted for optimal mulching and discharge functions. Therefore, it is manifestly intended that this invention be limited only by the claims and the equivalents thereof.

What is claimed is:

1. A lawn mower assembly comprising:
    a mulching blade having first primary cutting surfaces located on a leading edge of the mulching blade and having an elevated trailing edge, the mulching blade further comprises an inwardly angled step extending from the leading edge to the trailing edge and angled toward a vertical axis of the mulching blade, the mulching blade is adapted to attach to a lawn mower such that when rotated about its vertical axis the primary cutting surfaces of the mulching blade rotate through a first horizontal plane; and
    a discharge blade having first primary cutting surfaces located on a leading edge of the discharge blade and having an elevated trailing edge that is outwardly angled away from a vertical axis of the discharge blade, the discharge blade is adapted to attach to the lawn mower in combination with the mulching blade such that when rotated about its vertical axis the primary cutting surfaces of the discharge blade rotate through a second horizontal plane, the second horizontal plane being vertically displaced above the first horizontal plane, wherein the mulching blade directs cut grass in operation toward a center of the lawn mower to be deposited on a ground surface under the lawn mower, and the discharge blade directs cut grass in operation away from the center of the lawn mower to be discharged through an opening in the lawn mower and deposited on a ground surface not under the lawn mower.

2. The lawn mower blade assembly of claim 1 wherein the discharge blade is adapted to attach to the lawn mower such that when the mulching blade and the discharge blade are rotated about their vertical axis, the first primary cutting surfaces of the discharge blade are angularly located less than 90 degrees behind the primary cutting surfaces of the mulching blade.

3. The lawn mower blade assembly of claim 2 wherein the first primary cutting surfaces of the discharge blade are angularly located less than 80 degrees behind the primary cutting surfaces of the mulching blade.

4. The lawn mower blade assembly of claim 1 wherein the mulching blade and the discharge blade each have cut-out sections to reduce a respective mass of the blades.

5. The lawn mower blade assembly of claim 1 wherein the second horizontal plane is vertically displaced at least ¼ inch above the first horizontal plane.

6. The lawn mower blade assembly of claim 1 wherein the mulching blade and the discharge blade are attached to the lawn mower which comprises a carriage assembly, and a motor mounted to the carriage assembly and having a vertical shaft extending downwardly from the carriage assembly for attaching the blades to the motor for rotation about their vertical axis.

7. The lawn mower blade assembly of claim 1 wherein the mulching blade and the discharge blade each include secondary cutting surfaces of their leading edges.

8. The lawn mower blade assembly of claim 1 wherein the mulching blade and the discharge blade each have cut-out sections to reduce a respective mass of the blades, a trailing edge of the cut-out sections is sharpened to provide an additional cutting surface.

9. The lawn mower blade assembly of claim 1 wherein the lawn mower blade assembly includes a feature to maintain a relative position between the mulching blade and the discharge blade when attached to the lawn mower.

10. A lawn mower comprising:
a carriage assembly;
a motor mounted to the carriage assembly and having a vertical shaft extending downwardly from the carriage assembly;
a mulching blade having first primary cutting surfaces located on a leading edge of the mulching blade and having an elevated trailing edge, the mulching blade further comprises an inwardly angled step extending from the leading edge to the trailing edge and angled toward a vertical axis of the mulching blade, the mulching blade is adapted to attach to the vertical shaft of the lawn mower at its vertical axis, such that when rotated about its vertical axis the primary cutting surfaces of the mulching blade rotate through a first horizontal plane; and
a discharge blade having first primary cutting surfaces located on a leading edge of the discharge blade and having an elevated trailing edge that is outwardly angled away from a vertical axis of the discharge blade, the discharge blade is adapted to attach to the vertical shaft of the lawn mower at its vertical axis, such that when rotated about its vertical axis the primary cutting surfaces of the discharge blade rotate through a second horizontal plane, the second horizontal plane being vertically displaced above the first horizontal plane, the discharge blade is adapted to attach to the vertical shaft such that when the mulching blade and the discharge blade are rotated about their vertical axis, the first primary cutting surfaces of the discharge blade are angularly located less than 90 degrees behind the primary cutting surfaces of the mulching blade, and wherein the mulching blade directs cut grass in operation toward a center of the lawn mower to be deposited on a ground surface under the lawn mower, and the discharge blade directs cut grass in operation away from the center of the lawn mower to be discharged through an opening in the lawn mower and deposited on a ground surface not under the lawn mower.

11. The lawn mower of claim 10 wherein the second horizontal plane is vertically displaced at least ¼ inch above the first horizontal plane.

12. The lawn mower of claim 10 wherein the mulching blade and the discharge blade each include secondary cutting surfaces of their leading edges.

13. The lawn mower of claim 10 wherein the mulching blade and the discharge blade each have cut-out sections to reduce a respective mass of the blades.

14. The lawn mower of claim 13 wherein a trailing edge of the cut-out sections is sharpened to provide an additional cutting surface.

* * * * *